(12) United States Patent
Ssubramaniam et al.

(10) Patent No.: US 12,552,975 B2
(45) Date of Patent: Feb. 17, 2026

(54) CARRIER FILM FOR SEMI-CONDUCTOR WAFER PROCESSING

(71) Applicant: TREDEGAR SURFACE PROTECTION, LLC, N. Chesterfield, VA (US)

(72) Inventors: Surya Ssubramaniam, Richmond, VA (US); Carl Douglas Ray, Chesterfield, VA (US); Kevin A. Brady, Cary, IL (US)

(73) Assignee: TREDEGAR SURFACE PROTECTION, LLC, N. Chesterfield, VA (US)

( * ) Notice: Subject to any disclaimer, the term of this patent is extended or adjusted under 35 U.S.C. 154(b) by 0 days.

(21) Appl. No.: 17/192,319

(22) Filed: Mar. 4, 2021

(65) Prior Publication Data

US 2021/0277293 A1    Sep. 9, 2021

Related U.S. Application Data

(60) Provisional application No. 63/106,199, filed on Oct. 27, 2020, provisional application No. 62/986,387, filed on Mar. 6, 2020.

(51) Int. Cl.
| | |
|---|---|
| *C09J 153/02* | (2006.01) |
| *C09J 7/20* | (2018.01) |
| *C09J 7/24* | (2018.01) |
| *C09J 7/38* | (2018.01) |
| *H01L 21/683* | (2006.01) |

(52) U.S. Cl.
CPC .............. *C09J 153/02* (2013.01); *C09J 7/201* (2018.01); *C09J 7/243* (2018.01); *C09J 7/387* (2018.01); *H01L 21/6836* (2013.01)

(58) Field of Classification Search
None
See application file for complete search history.

(56) References Cited

U.S. PATENT DOCUMENTS

| | | | |
|---|---|---|---|
| 4,024,312 A * | 5/1977 | Korpman | C09J 7/24 602/903 |
| 4,226,952 A | 10/1980 | Halasa et al. | |
| 4,259,220 A | 3/1981 | Bunnelle et al. | |
| 4,853,286 A | 8/1989 | Narimatsu et al. | |

(Continued)

FOREIGN PATENT DOCUMENTS

| | | |
|---|---|---|
| CN | 104379667 A | 2/2015 |
| CN | 102986007 B | 6/2015 |

(Continued)

OTHER PUBLICATIONS

Machine translation of WO 2015/005266 A1. (Year: 2015).*

(Continued)

*Primary Examiner* — Alicia Chevalier
*Assistant Examiner* — Thomas A Mangohig
(74) *Attorney, Agent, or Firm* — KARCESKI IP LAW, PLLC (57) ABSTRACT

A carrier film includes an adhesive layer, a core layer, and a release layer. The adhesive layer includes a hydrogenated styrene block copolymer having a storage modulus (G') of less than or equal to 400 kPa at 25° C., and a first polyolefin elastomer. The core layer includes a second polyolefin elastomer, and the release layer includes a polyolefin.

17 Claims, 4 Drawing Sheets

(56) References Cited

U.S. PATENT DOCUMENTS

| | | |
|---|---|---|
| 5,648,136 A | 7/1997 | Bird |
| 6,472,065 B1 | 10/2002 | Alahapperuma et al. |
| 7,097,040 B1 | 8/2006 | Gutentag |
| 8,106,522 B2 | 1/2012 | Sato et al. |
| 8,586,415 B2 | 11/2013 | Matsumura et al. |
| 8,728,910 B2 | 5/2014 | Hayashishita et al. |
| 9,312,162 B2 | 4/2016 | Sato et al. |
| 9,324,592 B2 | 4/2016 | Maruyama et al. |
| 9,570,335 B2 | 2/2017 | Maruyama et al. |
| 9,931,808 B1 | 4/2018 | Varma et al. |
| 9,934,997 B2 | 4/2018 | Tsukui et al. |
| 10,008,406 B2 | 6/2018 | Nakajima et al. |
| 10,081,155 B2 | 9/2018 | Varma et al. |
| 10,105,927 B1 | 10/2018 | Varma et al. |
| 10,150,896 B2 | 12/2018 | Santoso et al. |
| 10,233,318 B2 | 3/2019 | Horiuchi et al. |
| 10,266,733 B2 | 4/2019 | Liu et al. |
| 10,438,831 B2 | 10/2019 | Taya et al. |
| 10,615,070 B2 | 4/2020 | Nakamura et al. |
| 10,854,495 B2 | 12/2020 | Aizawa et al. |
| 2003/0031862 A1 | 2/2003 | Yamamoto et al. |
| 2003/0054643 A1 | 3/2003 | Aihara et al. |
| 2003/0064579 A1 | 4/2003 | Miyakawa et al. |
| 2008/0085977 A1 | 4/2008 | Okamoto et al. |
| 2008/0193728 A1 | 8/2008 | Yoshida et al. |
| 2008/0206505 A1* | 8/2008 | Blackwell ................. G09F 3/02 428/354 |
| 2012/0259050 A1 | 10/2012 | Vitrano et al. |
| 2012/0309170 A1 | 12/2012 | Hayashishita et al. |
| 2013/0225020 A1* | 8/2013 | Flood ...................... C08K 3/20 524/505 |
| 2014/0335299 A1* | 11/2014 | Wang ...................... C08L 99/00 524/505 |
| 2014/0364532 A1 | 12/2014 | DuBois et al. |
| 2015/0332970 A1 | 11/2015 | Lei et al. |
| 2016/0177151 A1* | 6/2016 | Santoso ................. C09J 123/08 428/352 |
| 2017/0213765 A1 | 7/2017 | Furutani et al. |
| 2017/0283661 A1* | 10/2017 | Yonezaki ........... C08F 220/1804 |
| 2017/0323589 A1 | 11/2017 | Mitchell et al. |
| 2018/0311937 A1 | 11/2018 | Hakemi et al. |
| 2020/0095475 A1 | 3/2020 | Sasaki et al. |
| 2020/0190371 A1 | 6/2020 | Jones et al. |
| 2021/0009870 A1 | 1/2021 | Ssubramaniam et al. |

FOREIGN PATENT DOCUMENTS

| | | | |
|---|---|---|---|
| CN | 104379667 B | 2/2017 | |
| JP | 2005068420 A | 3/2005 | |
| JP | 2009098976 A | 5/2009 | |
| JP | 2013124293 A | 6/2013 | |
| JP | 2015005266 A | 1/2015 | |
| JP | 6283029 B2 | 2/2018 | |
| TW | 201842115 A | 12/2018 | |
| WO | 2009098976 A1 | 8/2009 | |
| WO | WO-2015005266 A1 * | 1/2015 | ............ C09J 123/02 |
| WO | 2019118244 A1 | 6/2019 | |

OTHER PUBLICATIONS

"Mitsui Chemicals to Increase Production Capacity for TAFMER High-Performance Elastomers," Business Wire, Aug. 24, 2018, p. 2 (retrieved Apr. 30, 2021 via https://www.businesswire.com/news/home/20180823005185/en/Mitsui-Chemicals-to-Increase-Production-Capacity-for-TAFMER%E2%84%A2-High-Performance-Elastomers.

International Search Report and Written Opinion dated May 20, 2021, for International Patent Application No. PCT/US2021/020877.

International Preliminary Report on Patentability dated Sep. 6, 2022, for International Patent Application No. PCT/US2021/020877.

Extended European Search Report dated Mar. 5, 2024, for European Patent Application No. 21764109.1.

Taiwanese Office Action dated Mar. 4, 2024, for Taiwanese Patent Application No. 110107897.

Japanese Office Action dated Dec. 3, 2024, for Japanese Patent Application No. 2022-549951.

Japanese Office Action dated Aug. 5, 2025, for Japanese Patent Application No. 2022-549951.

Korean Office Action dated Apr. 3, 2025, for Korean Patent Application No. 10-2022-7034125.

Taiwanese Office Action dated Apr. 9, 2025, for Taiwanese Patent Application No. 110107897.

* cited by examiner

CARRIER FILM FOR SEMI-CONDUCTOR WAFER PROCESSING

CROSS-REFERENCE TO RELATED APPLICATIONS

This application claims the benefit of priority to U.S. Provisional Patent Application Ser. No. 62/986,387, filed Mar. 6, 2020, and U.S. Provisional Patent Application Ser. No. 63/106,199, filed Oct. 27, 2020, the entire contents of both of which are incorporated herein by reference.

FIELD

The present invention is related to a carrier film that may be used to hold silicon wafers before and during a wafer dicing process, as well as dies created during the wafer dicing process.

BACKGROUND

Typical wafer dicing films or tapes used in semiconductor wafer dicing operations include a base substrate with a pressure-sensitive adhesive on one side of the base substrate. In order for the film to be wound in roll form during manufacturing and unwound when ready to use without damaging the pressure-sensitive adhesive, many films have a release coating that includes, for example, silicone, on an opposite side of the base film as the pressure-sensitive adhesive.

When the film is wound into a master roll, the release coating contacts the pressure-sensitive adhesive. When the film is unwound from the master roll, the pressure-sensitive adhesive separates from the release coating. Other known wafer dicing films use release liners in place of the silicone coating to remove silicone, which may cause contamination issues, from the product. The release liner is used to protect the pressure-sensitive adhesive while the film is wound and to allow for easy unwinding when the film is ready to use.

In addition, a typical pressure-sensitive adhesive used for wafer dicing films includes a UV-curable acrylic copolymer, for example, that allows for the adhesive properties of the pressure-sensitive adhesive to change when subjected to ultra-violet (UV) light. For example, prior to a wafer dicing process, the film may support a silicon wafer with the pressure-sensitive adhesive contacting the wafer with sufficient adhesive force to hold the wafer in place as the wafer is diced into semiconductor chips. Exposing the film to UV light may change the adhesive properties of the pressure-sensitive adhesive such that the individual semiconductor chips or dies may be easily removed from the film and placed elsewhere. Some wafer dicing films that use non-UV-curable acrylic copolymers in the pressure-sensitive adhesive are known to leave undesirable residue on the semiconductor chips when the semiconductor chips are removed from the wafer dicing film.

It is desirable to have a wafer dicing film that has an adhesive surface that will allow a wafer to be held firmly by the film during the dicing process, will allow individual chips to be removed from the film without damaging the chips or leaving excessive residue on the chips, and does not include a release liner or silicone coating in order for the film to be wound and unwound from a roll without damaging the adhesive surface.

SUMMARY OF THE INVENTION

According to an aspect of the invention, there is provided a carrier film that includes an adhesive layer, a core layer, and a release layer. The adhesive layer includes a hydrogenated styrene block copolymer having a storage modulus (G') of less than or equal to 400 kPa at 25° C., and a first polyolefin elastomer. The core layer includes a second polyolefin elastomer, and the release layer includes a polyolefin.

In an embodiment, the hydrogenated styrene block copolymer has a storage modulus (G') of less than or equal to 300 kPa at 25° C.

In an embodiment, the hydrogenated styrene block copolymer has a melt flow rate (MFR) of greater than 200 g/10 minutes at 230° C. under a 2.16 kg mass.

In an embodiment, the hydrogenated styrene block copolymer has a styrene content of at least 20%.

In an embodiment, the first polyolefin elastomer and the second polyolefin elastomer are the same material. In an embodiment, the first polyolefin elastomer and the second polyolefin elastomer are ethylene-octene copolymers.

In an embodiment, the first polyolefin elastomer is an alpha-olefin copolymer. In an embodiment, the second polyolefin elastomer is an ethylene-octene copolymer.

In an embodiment, the core layer includes a third polyolefin elastomer. In an embodiment, the second polyolefin elastomer and the third polyolefin elastomer have different melt flow rates (MFRs).

In an embodiment, the core layer also includes low density polyethylene.

In an embodiment, the polyolefin in the release layer is low density polyethylene. In an embodiment, the release layer also includes high density polyethylene.

In an embodiment, the carrier film has a machine direction maximum elongation of greater than or equal to 590%.

In an embodiment, the carrier film has a machine direction tensile strength of greater than or equal to 25 MPa.

These and other aspects, features, and characteristics of the present invention, as well as the methods of operation and functions of the related elements of structure and the combination of parts and economies of manufacture, will become more apparent upon consideration of the following description and the appended claims with reference to the accompanying drawings, all of which form a part of this specification. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

BRIEF DESCRIPTION OF THE DRAWINGS

The components of the following figures are illustrated to emphasize the general principles of the present disclosure and are not necessarily drawn to scale. Reference characters designating corresponding components are repeated as necessary throughout the figures for the sake of consistency and clarity.

DETAILED DESCRIPTION OF EMBODIMENTS OF THE INVENTION

Figure 1:
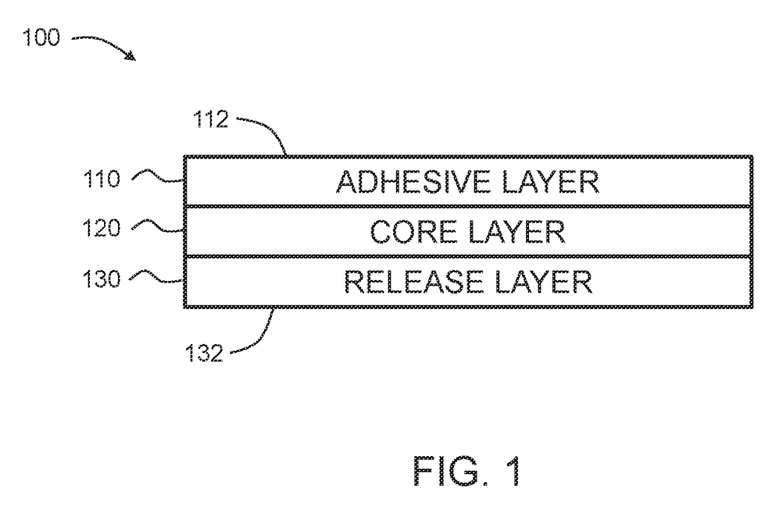
FIG. 1 is a schematic cross-section of a carrier film in accordance with embodiments of the invention.

FIG. 1 schematically illustrates a cross-section of a carrier film 100 in accordance with embodiments of the invention. As illustrated, the carrier film 100 includes an adhesive layer 110 on one side of a core layer 120, and a release layer 130 on an opposite side of the core layer 120 as the adhesive layer 110. The adhesive layer 110 includes an outer adhesive surface 112, and the release layer 130 includes an outer release surface 132. When the carrier film 100 is wound into a roll, the adhesive surface 112 contacts the release surface 132.

Figure 2:
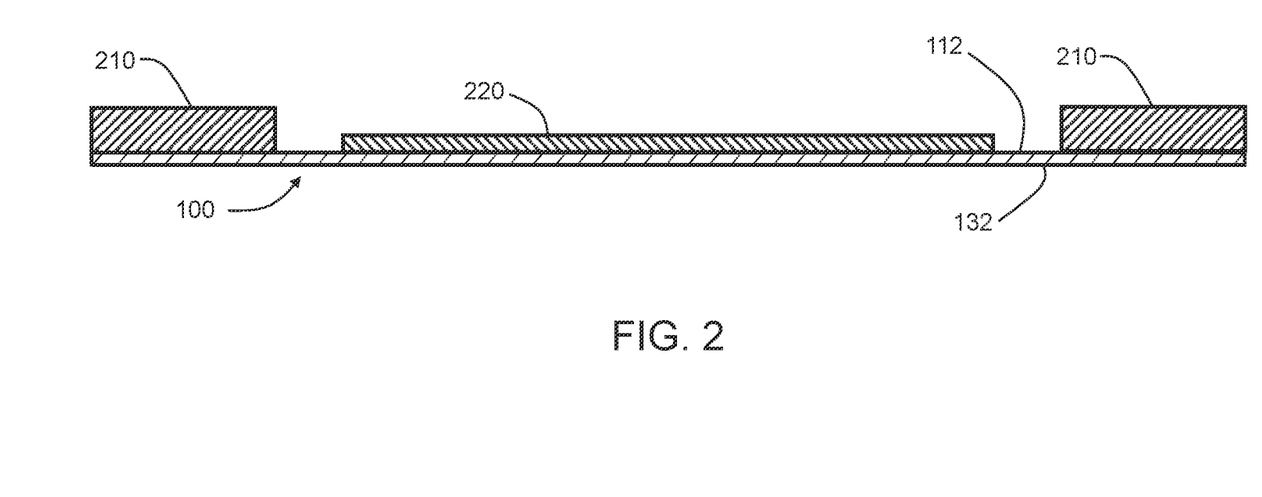
FIG. 2 is a schematic cross-section of the carrier film of FIG. 1 attached to a frame and a silicon wafer supported by the carrier film.

FIG. 2 schematically illustrates an embodiment of the use of the carrier film 100 as a wafer dicing film. As illustrated, the carrier film 100 is attached to a frame 210 via the adhesive surface 112 of the adhesive layer 110. The frame 210 may be made from stainless steel, for example. A silicon wafer 220 is supported by and attached to the carrier film 100 within the frame 210 via the adhesive surface 112 of the adhesive layer 110. After the carrier film 100 has been attached to the frame 210 and the silicon wafer 220 has been placed on the carrier film 100 within the frame 210, the frame 210 may be inserted or placed in a wafer dicing machine (not shown) for processing.

Figure 3:
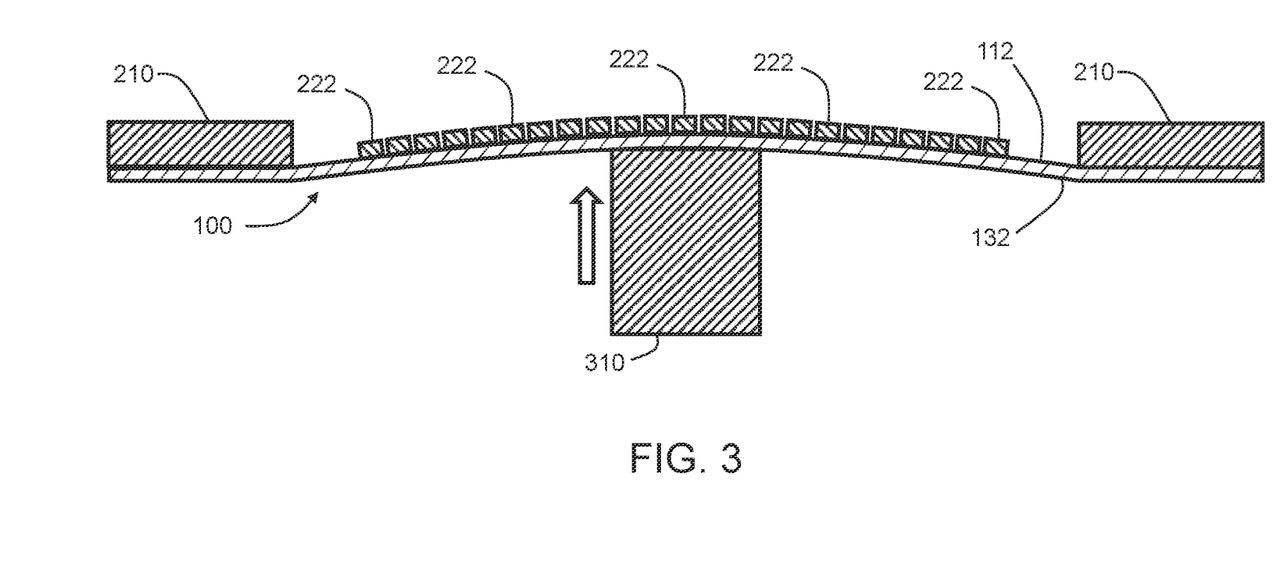
FIG. 3 is a schematic cross-section of the carrier film, frame and silicon wafer of FIG. 2 after the silicon wafer has been diced into chips and a plunger has pushed the carrier film upward to separate the chips.

As schematically illustrated in FIG. 3, after the wafer 220 has been diced into individual chips 222, a plunger 310 may be used to push the carrier film 100 upward so that the individual chips 222 may further separate and be picked off of the carrier film 100 for further processing. After all of the chips 222 have been removed from the carrier film 100, the carrier film 100 may be removed from the frame 210 and discarded or recycled.

Returning to FIG. 1, the release layer 130 may include one or more polyolefins, such as low density polyethylene (LDPE), linear low density polyethylene (LLDPE), high density polyethylene (HDPE), medium density polyethylene (MDPE), polypropylene (PP), random copolymer polypropylene, polypropylene impact copolymers, or metallocene linear low density polyethylene, and mixtures thereof. In an embodiment, the release layer 130 may include a suitable polyolefin mixture of low density polyethylene (LDPE) and high density polyethylene (HDPE) in a ratio of 90:10 to 40:60 by weight. In an embodiment, the release layer 130 may include LDPE, but not include HDPE. In an embodiment, one or more additives, such as an antioxidant, may be included in the release layer 130.

The thickness of the release layer 130 may be between about 1 µm and about 20 µm, such as between about 5 µm and about 15 µm, such as about 5 µm, about 6 µm, about 7 µm, about 8 µm, about 9 µm, about 10 µm, about 11 µm, about 12 µm, about 13 µm, about 14 µm, or about 15 µm.

The core layer 120 may include one or more polyolefin elastomers, such as an ethylene-octene copolymer, or an ethylene-butene copolymer, and one or more polyolefins, such as low density polyethylene (LDPE), linear low density polyethylene (LLDPE), high density polyethylene (HDPE), medium density polyethylene, polypropylene (PP), random copolymer polypropylene, polypropylene impact copolymers, or metallocene linear low density polyethylene, and mixtures thereof. The core layer 120 may include one or more additives, such as an antioxidant.

In an embodiment of the invention, the core layer 120 forms the bulk of the carrier film thickness (e.g., at least 75%) and therefore may provide the desired mechanical properties of the carrier film 100, such as good impact strength and excellent deformation behavior and elongation to allow the carrier film 100 to stretch during wafer processing, as described above with respect to FIG. 3. Polyolefin elastomers, such as ENGAGE™ ethylene-octene copolymers manufactured by Dow Chemical Company, including but not limited to ENGAGE™ 8450 (melt flow rate (MFR)=3 g/10 min. @ 190° C. under a 2.16 kg mass; density=0.902 g/cm$^3$) and ENGAGE™ 8402 (melt flow rate (MFR)=30 g/10 min. @ 190° C. under 2.16 kg mass; density=0.902 g/cm$^3$) may be useful as components of the core layer 120.

The melt processability of the core layer 120 that includes such a polyolefin elastomer during manufacturing may be improved by blending the polyolefin elastomer with another polyolefin elastomer having a higher melt flow rate (MFR) and or with a polyolefin, such as a high pressure, low-density polyethylene (LDPE) manufactured by autoclave process technology.

The thickness of the core layer 120 of the carrier film 100 in accordance with embodiments of the invention may be between about 40 µm and about 80 µm, such as between about 50 µm and about 70 µm, such as about 50 µm, about 51 µm, about 52 µm, about 53 µm, about 54 µm, about 55 µm, about 56 µm, about 57 µm, about 58 µm, about 59 µm, about 60 µm, about 61 µm, about 62 µm, about 63 µm, about 64 µm, about 65 µm, about 66 µm, about 67 µm, about 68 µm, about 69 µm or about 70 µm.

The adhesive layer 110 according to embodiments of the carrier film 100 includes a blend of one or more hydrogenated styrene block copolymers, and one or more polyolefin elastomers, such as an ethylene-octene copolymer, an ethylene-butene copolymer, or an alpha-olefin copolymer. The adhesive layer 110 may also optionally include one or more polyolefins, such as a low density polyethylene (LDPE) and/or a high density polyethylene (HDPE).

Suitable hydrogenated styrene block copolymers may have a polystyrene block-polydiene block polymer structure prior to hydrogenation. The hydrogenated block copolymer, before hydrogenation, may be linear or radial. Suitable polydienes for the hydrogenated styrene block copolymer include polybutadiene (1,3-butadiene), polyisoprene and mixtures thereof. Hydrogenation of the polystyrene block-polydiene block structure may result in a styrene-ethylene-butylene-styrene polymeric structure, otherwise referred to as "SEBS", or a styrene-ethylene-propylene-styrene, otherwise referred to as "SEPS", for example. In embodiments of the invention, the styrene content of the hydrogenated styrene block copolymer may be between 10 wt. % and 50 wt. %. In an embodiment, the styrene content of the hydrogenated styrene block copolymer may be greater than or equal to 20%.

The storage modulus (G') of a thermoplastic is a measure of the material's ability to store energy elastically and can be measured by dynamic mechanical analysis ("DMA") at a constant frequency across a temperature sweep. The storage modulus (G') of the hydrogenated styrene block copolymer may be less than 400 kPa, such as less than 300 kPa, such as less than 250 kPa at 25° C. at a frequency of 1 Hz.

In various embodiments of the invention, the adhesive layer 110 may comprise 50% to 100%, by weight, hydrogenated styrene block copolymer. In such embodiments, the adhesion layer 110 may also comprise 0% to 50%, by weight, polyolefin elastomer.

The Melt Flow Rates ("MFR") of thermoplastics, such as hydrogenated styrene block copolymers, polyolefin elastomers, and polyolefins are inversely correlated to viscosities of the thermoplastics. A high MFR means that the thermoplastic has a low viscosity and vice-versa. As used herein, unless otherwise stated, "MFR" shall mean the Melt Flow Rate as determined according to ASTM D-1238, at 230° C. under a 2.16 kg mass and measured in grams per 10 minutes. Suitable hydrogenated styrene block copolymers for the adhesive layer 110 may have an MFR between about 10 g/10 min. and about 300 g/10 min. Suitable polyolefin elastomers for the adhesive layer 110 may have an MFR between about 1 g/10 min. (at 190° C. under a 2.16 kg mass) and about 100 g/10 min. (at 190° C. under a 2.16 kg mass).

The thickness of the adhesive layer 110 of the carrier film 100 in accordance with embodiments of the present invention may be between about 1 μm and about 20 μm, such as between about 3 μm and about 15 μm, such as about 3 μm, about 4 μm, about 5 μm, about 6 μm, about 7 μm, about 8 μm, about 9 μm, about 10 μm, about 11 μm, about 12 μm, about 13 μm, about 14 μm, or about 15 μm.

Examples

Three different hydrogenated styrene block copolymers were investigated for use in the adhesive layer 110 of the carrier film 100. Specifically, SEPTON™ 2063, manufactured by Kuraray Co., Ltd., KRATON™ MD1653, manufactured by Kraton Performance Polymers, Inc., and KRATON™ MD1648, manufactured by Kraton Performance Polymers, Inc. were investigated. Various properties of each resin are summarized in Table I below.

TABLE I

Properties of Hydrogenated Styrene Block Copolymers

| Resin | MFR (230° C./ 2.16 kg) | Styrene Content | Storage Modulus (G') at 25° C. |
|---|---|---|---|
| SEPTON ™ 2063 | 7 g/10 min | 13% | 34 kPa |
| KRATON ™ MD1653 | 25 g/10 min | 31% | 20 MPa |
| KRATON ™ MD1648 | 220 g/10 min | 20% | 215 kPa |

The MFR and styrene content values were taken from resin specification sheets from Kuraray Co., Ltd. (for SEPTON™ 2063) and Kraton Performance Polymers, Inc. (for KRATON™ MD1653 and KRATON™ MD1648). The storage modulus (G') was measured by a DMA temperature sweep at a frequency of 1 Hz.

Figure 4:
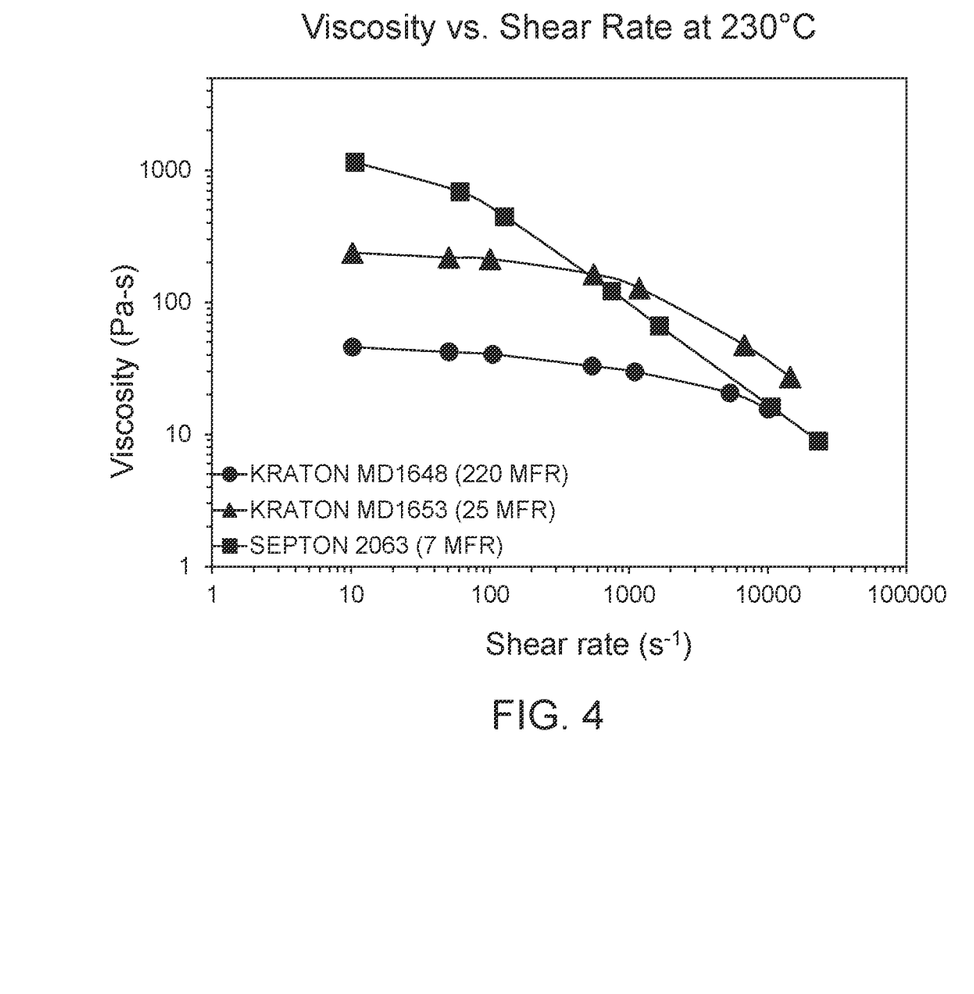
FIG. 4 is a plot of viscosity as a function of shear rate as measured by capillary rheometry at 230° C. of three hydrogentated styrene block copolymers for use in an adhesive layer of the carrier film of FIG. 1.

Capillary rheometry was also performed on the hydrogenated styrene block copolymers in accordance with ASTM D3835 on a Goettfert Rheograph 20 Model Capillary Rheometer using a 2000 bar pressure transducer. A round hole 30 mm length/1 mm diameter die with an entrance angle of 180° was used. Each material was equilibrated in the barrel for 10 minutes before testing started. Corrected shear viscosity curves were collected at a constant test temperature of 230° C. The results are illustrated in FIG. 4. The high flow characteristic of KRATON™ MD1648 may improve the processability of the adhesive layer 110, and provide relatively high levels of adhesion of the carrier film 100 onto the stainless steel frame 210 and the silicon wafer 220, as desired.

A cast extrusion line equipped with three extruders, one for each layer, was used to extrude carrier films 100 with a target thickness of 85 μm. The layer thickness ratio of the adhesive layer 110, the core layer 120, and the release layer 130 was 10:75:15 (i.e. 8.5 μm/63.75 μm/12.75 μm). Nitrogen gas was introduced at the feed throat of each of the extruders to provide an inert atmosphere for the extrusion process. During extrusion, the adhesive layer 110 was cast on a matted chill roll with an average surface roughness (Ra) of 16 microinches (0.406 microns). An embossing nip roller with an average surface roughness (Ra) of 30 microinches (0.762 microns) was used to provide surface texture to the release layer 130.

Example 1: The adhesive layer 110 was a blend of 85 wt. % KRATON™ MD1648 hydrogenated styrene block copolymer and 15 wt. % ENGAGE™ 8450 polyolefin elastomer (ethylene-octene). The core layer 120 was 100 wt. % ENGAGE™ 8450 polyolefin elastomer. The release layer 130 was a blend of 80 wt. % low density polyethylene (LDPE) and 20 wt. % high density polyethylene (HDPE).

Example 2: The adhesive layer 110 was a blend of 85 wt. % KRATON™ MD1648 hydrogenated styrene block copolymer and 15 wt. % ENGAGE™ 8450 polyolefin elastomer. The core layer 120 was a blend of 75 wt. % ENGAGE™ 8450 polyolefin elastomer and 25 wt. % ENGAGE™ 8402 polyolefin elastomer (ethylene-octene). The release layer 130 was a blend of 80 wt. % LDPE and 20 wt. % HDPE.

Example 3: The adhesive layer 110 was a blend of 85 wt. % KRATON™ MD1648 hydrogenated styrene block copolymer and 15 wt. % ENGAGE™ 8450 polyolefin elastomer. The core layer 120 was a blend of 50 wt. % ENGAGE™ 8450 polyolefin elastomer, 25 wt. % ENGAGE™ 8402 polyolefin elastomer, and 25 wt. % LDPE. The release layer 130 was a blend of 80 wt. % LDPE and 20 wt. % HDPE.

Example 4: The adhesive layer 110 was a blend of 85 wt. % KRATON™ MD1653 hydrogenated styrene block copolymer and 15 wt. % ENGAGE™ 8450 polyolefin elastomer. The core layer 120 was 100 wt. % ENGAGE™ 8450 polyolefin elastomer. The release layer 130 was a blend of 80 wt. % LDPE and 20 wt. % HDPE.

Example 5: The adhesive layer 110 was a blend of 85 wt. % SEPTON™ 2063 hydrogenated styrene block copolymer and 15 wt. % ENGAGE™ 8450 polyolefin elastomer. The core layer 120 was 100 wt. % ENGAGE™ 8450 polyolefin elastomer. The release layer 130 was a blend of 80 wt. % LDPE and 20 wt. % HDPE.

Each of the Example 1-5 samples was tested for adhesion to a stainless steel substrate (to mimic the frame 210 made from stainless steel), as well as adhesion to a silicon wafer (to mimic the silicon wafer 220) by measuring the 180° peel force of 1 inch wide specimens that were allowed to age under ambient conditions for 3 weeks prior to testing. The silicon wafer was a CZ-P 4-inch diameter mirror-polished wafer manufactured by Alpha Nanotech Inc. A model Ta.xt Plus texture analyzer manufactured by Texture Technologies Corp. was used to measure the 180° peel force at a constant peel rate of 5 mm/second. The results are listed in Table II below.

TABLE II

Adhesion Properties - 180° Peel Force Values After 3 Weeks

| Sample | 180° Peel Force Value After 3 Weeks on Stainless Steel (g/inch) | 180° Peel Force Value After 3 Weeks on Silicon Wafer (g/inch) |
|---|---|---|
| Example 1 | 54 | 48 |
| Example 2 | 56 | 41 |
| Example 3 | 48 | 37 |
| Example 4 | 17 | 11 |

TABLE II-continued

Adhesion Properties - 180° Peel Force Values After 3 Weeks

| Sample | 180° Peel Force Value After 3 Weeks on Stainless Steel (g/inch) | 180° Peel Force Value After 3 Weeks on Silicon Wafer (g/inch) |
|---|---|---|
| Example 5 | 2 | 3 |

Of all of the samples, Examples 1-3, which each include KRATON™ MD1648 in the adhesive layer 110 had the highest 180° Peel Force Values on both the stainless steel substrate and the silicon wafer.

Each of the carrier film samples were also measured for mechanical properties, including tensile strength, and elongation at break in the machine direction (MD), in accordance to ASTM-D882. The results of the mechanical testing are listed in Table III below.

TABLE III

Tensile Strength and Maximum Elongation

| Sample | MD Tensile Strength (MPa) | MD Maximum Elongation (%) |
|---|---|---|
| Example 1 | 45 | 602 |
| Example 2 | 39 | 624 |
| Example 3 | 29 | 648 |
| Example 4 | 37 | 537 |
| Example 5 | 44 | 626 |

A Zygo Optical profilometer was used to estimate the amount of residue on a silicon wafer, both before and after a carrier film 100 was adhered to the wafer and removed. More specifically, the surface roughness of the wafer was measured and the Mean Calculated Residue Volume was calculated as the incremental volume above the mean surface relative to the mean surface height of the clean silicon wafer. Assuming that residue transference adds to the existing silicon wafer surface roughness, the amount of residue that was transferred or left behind by the sample was calculated as the Residue Transferred Volume. Five locations (360 μm×270 μm) were analyzed for each laminated silicon wafer and the Mean Calculated Residue Volume was calculated in units of $\mu m^3/cm^2$. The results of the residue analysis from optical profilometry are presented Table IV below.

TABLE IV

Residue on Silicon Wafer from Optical Profilometry

| Sample | Mean Calculated Residue Volume ($\times 10^3\ \mu m^3/cm^2$) | Residue Transferred Volume ($\times 10^3\ \mu m^3/cm^2$) |
|---|---|---|
| Clean silicon wafer | 61.3 | — |
| Example 1 | 61.5 | 0.2 |
| Example 4 | 447.9 | 386.6 |
| Example 5 | 76.9 | 15.6 |

Example 1, which included KRATON™ MD1648, left the lowest amount of residue for a sample with a hydrogenated styrene block copolymer and was comparable to the clean silicon wafer.

Two additional samples of multilayer carrier films 100 having a target thickness of 85 μm and a layer thickness ratio of the adhesive layer 110, the core layer 120, and the release layer 130 of 10:75:15 (i.e. 8.5 μm/63.75 μm/12.75 μm) were extruded in the manner as described above.

Example 6: Similar to Example 3, the adhesive layer 110 was a blend of 85 wt. % KRATON™ MD1648 hydrogenated styrene block copolymer and 15 wt. % ENGAGE™ 8450 polyolefin elastomer, the core layer 120 was a blend of 50 wt. % ENGAGE™ 8450 polyolefin elastomer, 25 wt. % ENGAGE™ 8402 polyolefin elastomer, and 25 wt. % LDPE, and the release layer 130 was a blend of 80 wt. % LDPE and 20 wt. % HDPE. During extrusion, the adhesive layer 110 was cast on a matted chill roll with an average surface roughness (Ra) of 16 microinches (0.406 microns). An embossing nip roller with an average surface roughness (Ra) of 30 microinches (0.762 microns) was used to provide surface texture to the release layer 130.

Example 7: The adhesive layer 110 was a blend of 90 wt. % KRATON™ MD1648 hydrogenated styrene block copolymer and 10 wt. % ABSORTOMER™ EP-1001 polyolefin elastomer (an alpha-olefin copolymer available from Mitsui Chemicals, Inc. and having a melt flow rate (MFR) of 10 g/10 min. at 230° C. under a 2.16 kg mass). The core layer 120 was a blend of 50 wt. % ENGAGE™ 8450 polyolefin elastomer, 25 wt. % ENGAGE™ 8402 polyolefin elastomer, and 25 wt. % LDPE, and the release layer 130 was a blend of 80 wt. % LDPE and 20 wt. % HDPE. During extrusion, the adhesive layer 110 was cast on a matted chill roll with an average surface roughness (Ra) of 22 microinches (0.559 microns). An embossing nip roller with an average surface roughness (Ra) of 30 microinches (0.762 microns) was used to provide surface texture to the release layer 130.

The adhesion strength (180° peel force) of each the Examples 6 and 7 samples that were laminated on stainless steel and a mirror-polished silicon wafer was measured using a model Ta.xt Plus texture analyzer (Texture Technologies Corp.). One-inch wide specimens were prepared on the respective substrate by compression with a 2 kg roller twice. The Peel Force was measured at a peel speed of 5 mm/sec. after a dwell time of 20 minutes and after a dwell time of 1 month to characterize the initial adhesion strength and any increase in adhesion strength over time. The ratio of the Peel Force Value after the samples had been aged for 1 month to the initial Peel Force Value is referred to herein as the "Adhesion Build Value". Results for the adhesion strength testing of Examples 6 and 7 are listed in Table V below.

TABLE V

Adhesion Strength - 180° Peel Force Values

| Sample | 180° Peel Force Value After 20 min. on Silicon Wafer (g/inch) | 180° Peel Force Value After 20 min. on Stainless Steel (g/inch) | 180° Peel Force Value After 1 Month on Stainless Steel (g/inch) | Adhesion Build Value for Stainless Steel |
|---|---|---|---|---|
| Example 6 | 11 | 14 | 95 | 6.8 |
| Example 7 | 13 | 12 | 16 | 1.3 |

The results indicate that Example 7 exhibited a much lower Adhesion Build Value for stainless steel than Example 6, which may be desirable. Without being bound by theory, it is postulated that the lower Adhesion Build Value for Example 7 may be attributed to the difference in glass transition temperatures ($T_g$) of the polyolefin elastomers in the adhesive layers 110 of the samples. For example, the $T_g$ of ENGAGE™ 8450 polyolefin elastomer is about −32° C., while the $T_g$ of the ABSORTOMER™ EP-1001 polyolefin elastomer is about +30° C. Therefore, at room temperature (about 23° C.), the ABSORTOMER™ EP-1001 polyolefin elastomer may be in the form of rigid domains within the adhesive layer 110, which may aid in preventing excessive adhesion build over time.

To test Examples 6 and 7 for potential residue transfer onto a silicon wafer, one-inch wide specimens were laminated to mirror-polished silicon wafers as described above for the Peel Force measurements. The trace organic contaminants left on the polished silicon wafer after delamination of the Examples 6 and 7 specimens were quantified using electron spectroscopy for chemical analysis (ESCA). The specimens were delaminated immediately prior to introduction into the analysis chamber of a PHI Quantum 2000 scanning ESCA microprobe with a monochromated $AlK_\alpha$ X-ray source and take-off angle set to 45°. The surface carbon atom ratio from a delaminated area of the silicon wafer, $C_d$ (%), was compared to the surface carbon atom ratio from a non-laminated area of the wafer, $C_n$ (%). The difference ($\Delta C_{d-n} = C_d - C_n$) was taken as the surface organic contamination of the wafer due to the film specimen. The results are listed in Table VI below.

TABLE VI

Surface Organic Contamination of Silicon Wafer

| Sample | $C_d$ (%) | $C_n$ (%) | $\Delta C_{d-n}$ (%) |
|---|---|---|---|
| Example 6 | 26.9 | 34.2 | −7.3 |
| Example 7 | 32.4 | 41.5 | −9.1 |

The results indicate that for both Example 6 and Example 7, the films did not leave any residue on the silicon wafer and may have actually removed residue from the silicon wafer.

Example 8: A sample of a multilayer carrier film 100 having a target thickness of 100 µm and a layer thickness ratio of the adhesive layer 110, the core layer 120, and the release layer 130 of 12:76:12 (i.e. 12 µm/76 µm/12 µm) was extruded in the manner as described above. The adhesive layer 110 was the same blend that was used for Example 7 (i.e. a blend of 90 wt. % KRATON™ MD1648 hydrogenated styrene block copolymer and 10 wt. % ABSORTOMER™ EP-1001 polyolefin elastomer). The core layer 120 was the same blend that was used for Example 7 (i.e., a blend of 50 wt. % ENGAGE™ 8450 polyolefin elastomer, 25 wt. % ENGAGE™ 8402 polyolefin elastomer, and 25 wt. % LDPE), and the release layer 130 was the same blend that was used for Example 7 (i.e., a blend of 80 wt. % LDPE and 20 wt. % HDPE). During extrusion, the adhesive layer 110 was cast on a matted chill roll with an average surface roughness (Ra) of 22 microinches (0.559 microns). An embossing nip roller with an average surface roughness (Ra) of 30 microinches (0.762 microns) was used to provide surface texture to the release layer 130.

Examples 6, 7 and 8 were compared to two commercially available films used for semiconductor wafer processing.

Comparative Example A was an Ultron 1009R film from Ultron Systems, Inc. with a PVC base substrate and an acrylic adhesive layer on one side thereof. The overall film thickness was 70 µm and the thickness of the adhesive layer was 10 µm.

Comparative Example B was a Nitto SWT 20+R semiconductor wafer processing tape from Nitto Denko Corporation with a PVC base substrate, an acrylic adhesive layer on one side thereof and a silicone release coating on the opposite side of the PVC base substrate. The overall film thickness was 75 µm and the thickness of the adhesive layer was 10 µm.

The adhesion strength (180° peel force) of samples of Examples 6-8 and Comparative Examples A and B that were laminated on stainless steel and on a mirror-polished silicon wafer was measured using a model Ta.xt Plus texture analyzer (Texture Technologies Corp.). One-inch wide specimens were prepared on the respective substrate by compression with a 2 kg roller twice. The Peel Force was measured at a peel speed of 5 mm/sec. after a dwell time of 20 minutes and after a dwell time of one week at room temperature to characterize the initial adhesion strength and any increase in adhesion strength over time. In addition, the samples were laminated on a mirror-polished silicon wafer and subjected to a temperature of 60° C. for one week. The Adhesion Build Value was calculated by dividing the Peel Force of each sample after aging by the initial Peel Force value. Table VII below lists the Peel Force and Adhesion Build Values for the samples that were laminated to stainless steel and aged for one week at room temperature. Table VIII below lists the Peel Force and Adhesion Build Values for the samples that were laminated to a mirror-polished silicon wafer and aged for one week at room temperature. Table IX below lists the Peel Force and Adhesion Build Values for the samples that were laminated to a mirror-polished silicon wafer and aged for one week at 60° C.

TABLE VII

Adhesion Strength - 180° Peel Force Values - Stainless Steel

| Sample | 180° Peel Force Value After 20 min. on Stainless Steel @ Room Temperature (g/inch) | 180° Peel Force Value After 1 Week on Stainless Steel @ Room Temperature (g/inch) | Adhesion Build Value for Stainless Steel @ Room Temperature |
|---|---|---|---|
| Example 6 | 21 | 72 | 3.4 |
| Example 7 | 19 | 44 | 2.3 |
| Example 8 | 49 | 128 | 2.6 |
| Comparative Example A | 27 | 74 | 2.7 |
| Comparative Example B | 60 | 128 | 2.1 |

TABLE VIII

Adhesion Strength - 180° Peel Force Values - Silicon Wafer

| Sample | 180° Peel Force Value After 20 min. on Silicon Wafer @ Room Temperature (g/inch) | 180° Peel Force Value After 1 Week on Silicon Wafer @ Room Temperature (g/inch) | Adhesion Build Value for Silicon Wafer @ Room Temperature |
|---|---|---|---|
| Example 6 | 11 | 21 | 1.9 |
| Example 7 | 13 | 21 | 1.6 |
| Example 8 | 56 | 129 | 2.3 |
| Comparative Example A | 15 | 33 | 2.2 |
| Comparative Example B | 50 | 103 | 2.1 |

TABLE IX

Adhesion Strength - 180° Peel Force Values - Silicon Wafer

| Sample | 180° Peel Force Value After 20 min. on Silicon Wafer @ Room Temperature (g/inch) | 180° Peel Force Value After 1 Week on Silicon Wafer @ 60° C. (g/inch) | Adhesion Build Value for Silicon Wafer @ 60° C. |
|---|---|---|---|
| Example 6 | 11 | 469 | 42.6 |
| Example 7 | 13 | 66 | 5.1 |
| Example 8 | 56 | 282 | 5.0 |
| Comparative Example A | 15 | 56 | 3.7 |
| Comparative Example B | 50 | 226 | 4.5 |

A quartz crystal microbalance with dissipation monitoring (QCM-D) was used to measure residue transference from the films. Experiments were performed on a QSense analyzer by Biolin Scientific using a quartz crystal sensor (QSensor) with a fundamental resonant frequency of 5 MHz. Frequency changes of the QSensor were measured as a function of time, and converted to mass changes at the sensor surface. The QSense open module and silica-coated QSensor were rinsed with isopropanol, followed by de-ionized water, then dried with nitrogen. The QSensor was further cleaned in a UV-Ozone cleaner to remove organic contaminants. A 10 mm circular sample was applied onto the QSensor and allowed to contact the sensor surface for 5 minutes. The sample was then carefully removed using PTFE tweezers. All measurements were performed at 23° C. and the results of the testing are listed in Table X below.

TABLE X

Residue Transference on Silica-Coated Quartz Sensor

| Sample | Residue Transference (ng/cm$^2$) |
|---|---|
| Example 6 | 10 |
| Example 7 | 4 |
| Example 8 | 26 |
| Comparative Example A | 108 |
| Comparative Example B | 127 |

The results of the residue transference testing indicated that the films of Examples 6, 7 and 8 transferred much less residue than the films of the Comparative Examples, which is desirable.

To further test the films of Examples 6 and 8, as well as Comparative Examples A and B, for potential residue transfer onto a silicon wafer, one-inch wide specimens of the films were laminated to mirror-polished silicon wafers as described above for the Peel Force measurements. The dwell time of each specimen on the silicon wafer was one week. The trace organic contaminants left on the polished silicon wafer after delamination of the specimens were quantified using electron spectroscopy for chemical analysis (ESCA). The specimens were delaminated immediately prior to introduction into the analysis chamber of a PHI Quantum 2000 scanning ESCA microprobe with a monochromated AlK$_\alpha$ X-ray source and take-off angle set to 45°. The surface carbon atom ratio from a delaminated area of the silicon wafer, $C_D$ (%), was compared to the surface carbon atom ratio of a blank wafer, $C_B$ (%). The difference ($\Delta C_{D-B} = C_D - C_B$) was taken as the surface organic contamination of the wafer due to the film specimen. The results are listed in Table XI below.

TABLE XI

Surface Organic Contamination of Silicon Wafer

| Sample | $\Delta C_{D-B}$ (%) |
|---|---|
| Example 6 | 17.8 |
| Example 8 | 10.0 |
| Comparative Example A | 22.5 |
| Comparative Example B | 21.4 |

The results listed in Table XI indicated that the films of Examples 6 and 8 left less surface organic contamination as compared to Comparative Examples A and B, which is desirable.

The embodiments described herein represent a number of possible implementations and examples and are not intended to necessarily limit the present disclosure to any specific embodiments. Instead, various modifications can be made to these embodiments, and different combinations of various embodiments described herein may be used as part of the invention, even if not expressly described, as would be understood by one of ordinary skill in the art. Any such modifications are intended to be included within the spirit and scope of the present disclosure and protected by the following claims.

What is claimed is:

1. A carrier film, comprising:
   an adhesive layer comprising 50% to 100% by weight of a hydrogenated styrene block copolymer having a storage modulus (G') of less than or equal to 400 kPa at 25° C. and 0% to 50% by weight of a first polyolefin elastomer, wherein a thickness of the adhesive layer is between about 1 μm and about 20 μm;
   a core layer comprising a second polyolefin elastomer, wherein a thickness of the core layer is between about 40 μm and about 80 μm; and
   a release layer comprising a polyolefin, wherein a thickness of the release layer is between about 1 μm and about 20 μm,
   wherein the thickness of the core layer is greater than a sum of the thickness of the adhesive layer and the thickness of the release layer,
   wherein the thickness of the core layer is at least 75% of a sum of the thickness of the adhesive layer, the thickness of the release layer, and the thickness of the core layer,
   wherein the hydrogenated styrene block copolymer in the adhesive layer has a melt flow rate (MFR) of between about 10 g/10 minutes and about 300 g/10 minutes at 230° C. under a 2.16 kg mass, and
   wherein the first polyolefin elastomer in the adhesive layer has a melt flow rate of between 1 g/10 minutes and about 100 g/10 minutes at 190° C. under a 2.16 kg mass.

2. The carrier film according to claim 1, wherein the hydrogenated styrene block copolymer having a storage modulus (G') of less than or equal to 300 kPa at 25° C.

3. The carrier film according to claim 1, wherein the hydrogenated styrene block copolymer has a styrene content of at least 20%.

4. The carrier film according to claim 1, wherein the carrier film has a machine direction maximum elongation of greater than or equal to 590%.

5. The carrier film according to claim 1, wherein the carrier film has a machine direction tensile strength of greater than or equal to 25 MPa.

6. The carrier film according to claim 1, wherein the hydrogenated styrene block copolymer in the adhesive layer comprises, before hydrogenation, a polystyrene block-polydiene block polymer structure that is at least one of linear and radial.

7. The carrier film according to claim 1, wherein the polyolefin in the release layer comprises at least one of low density polyethylene (LDPE), linear low density polyethylene (LLDPE), high density polyethylene (HDPE), medium density polyethylene (MDPE), polypropylene (PP), random copolymer polypropylene, polypropylene impact copolymers, and metallocene linear low density polyethylene.

8. The carrier film according to claim 1, wherein the second polyolefin elastomer in the core layer comprises:
at least one of an ethylene-octene copolymer, an ethylene-butene copolymer, and
at least one polyolefin.

9. The carrier film according to claim 1, wherein the first polyolefin elastomer and the second polyolefin elastomer are the same material.

10. The carrier film according to claim 9, wherein the first polyolefin elastomer and the second polyolefin elastomer are ethylene-octene copolymers.

11. The carrier film according to claim 1, wherein the first polyolefin elastomer is an alpha-olefin copolymer.

12. The carrier film according to claim 11, wherein the second polyolefin elastomer is an ethylene-octene copolymer.

13. The carrier film according to claim 1, wherein the polyolefin in the release layer is low density polyethylene.

14. The carrier film according to claim 13, wherein the release layer further comprises high density polyethylene.

15. The carrier film according to claim 1, wherein the core layer further comprises a third polyolefin elastomer.

16. The carrier film according to claim 15, wherein the second polyolefin elastomer and the third polyolefin elastomer have different melt flow rates (MFRs).

17. The carrier film according to claim 16, wherein the core layer further comprises low density polyethylene.

* * * * *